United States Patent
Wacknov et al.

(10) Patent No.: US 6,232,742 B1
(45) Date of Patent: May 15, 2001

(54) DC/AC INVERTER APPARATUS FOR THREE-PHASE AND SINGLE-PHASE MOTORS

(75) Inventors: Joel B. Wacknov, Monrovia; Wally E. Rippel, Altadena, both of CA (US)

(73) Assignee: AeroVironment Inc., Monrovia, CA (US)

( * ) Notice: Subject to any disclaimer, the term of this patent is extended or adjusted under 35 U.S.C. 154(b) by 0 days.

(21) Appl. No.: 08/284,160

(22) Filed: Aug. 2, 1994

(51) Int. Cl.⁷ .................................................. H02P 5/28
(52) U.S. Cl. ......................... 318/811; 318/801; 318/774; 318/785
(58) Field of Search .................. 318/798–815, 318/774–6, 772–785, 794

(56) References Cited

U.S. PATENT DOCUMENTS

| | | | |
|---|---|---|---|
| 4,354,223 | 10/1982 | Turnbull | 363/124 |
| 4,849,871 | 7/1989 | Wallingford | 363/41 |
| 5,105,141 | 4/1992 | Ernest | 318/805 |
| 5,168,439 | 12/1992 | Kumar et al. | 363/95 |

Primary Examiner—David Martin
(74) Attorney, Agent, or Firm—Sheppard, Mullin, Richter & Hampton LLP; James R. Brueggemann

(57) ABSTRACT

Electrical power apparatus is disclosed for selectively powering either a three-phase ac motor or a single-phase ac motor. A dc/ac inverter is configured to provide appropriately phased input signals to the three input terminals of whichever motor is being driven, with no substantial hardware reconfiguration being required. In addition, a special clamp circuit prevents an excessively high voltage from being applied to the inverter by a variable-voltage power source such as a photovoltaic array, whereby the inverter need not be sized to accommodate voltage levels substantially greater than its design voltage.

5 Claims, 3 Drawing Sheets

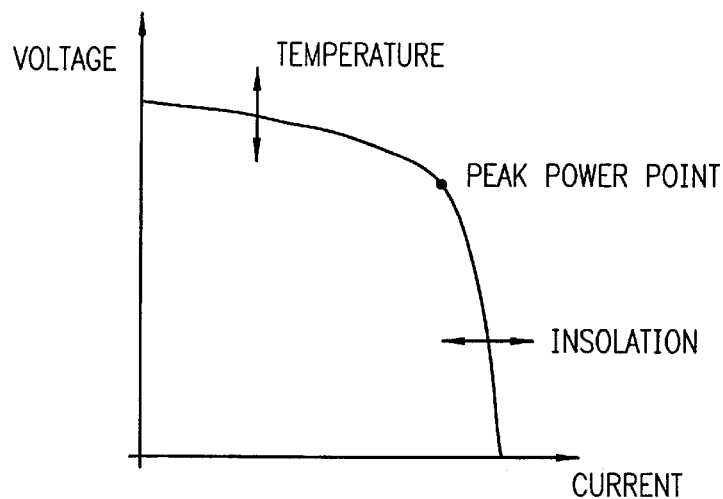
FIG. 1
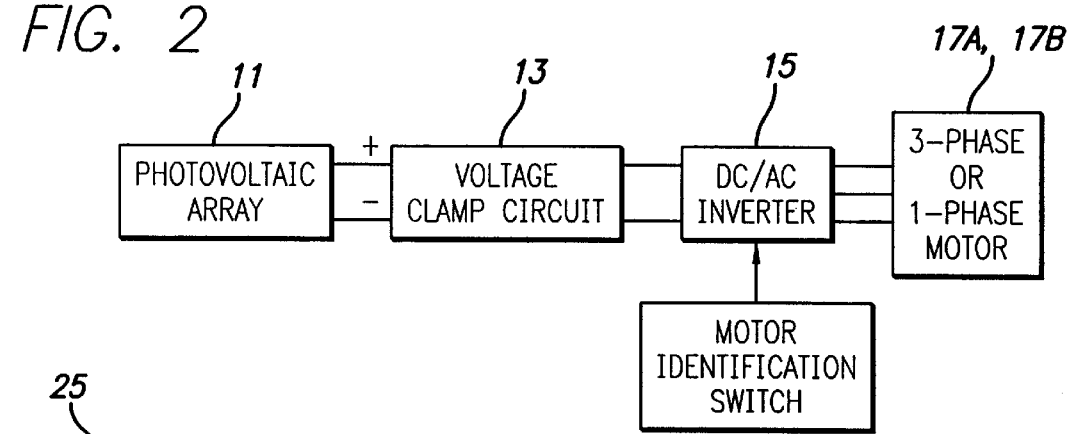
FIG. 2
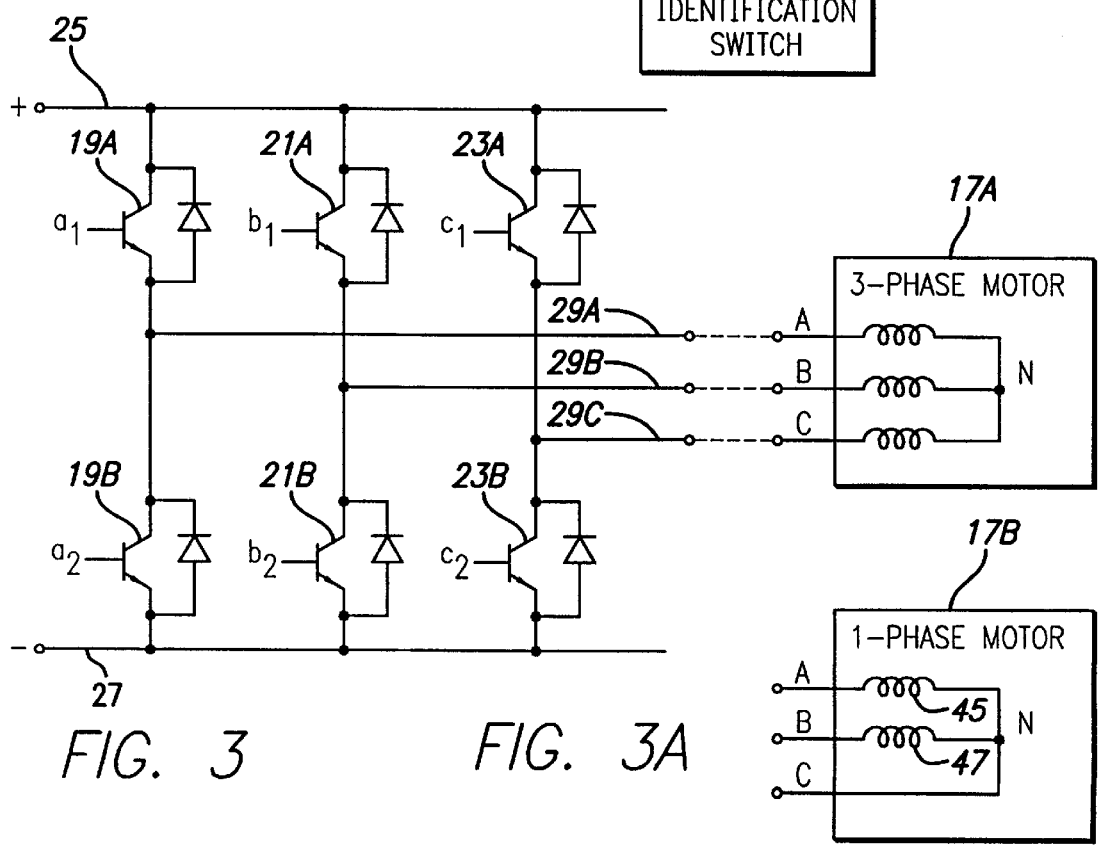
FIG. 3
FIG. 3A

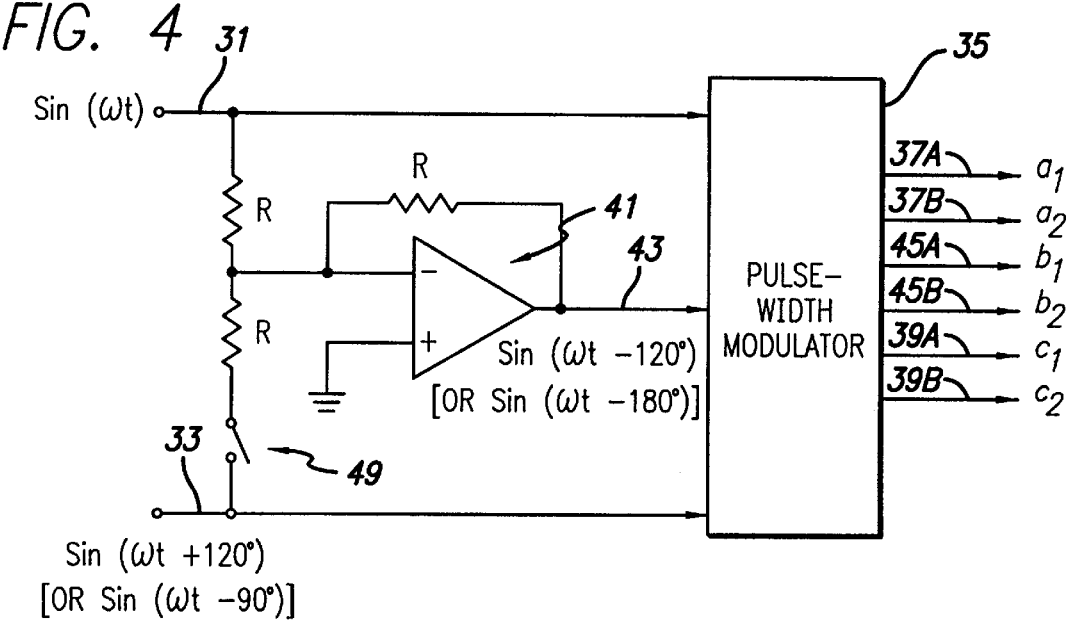
FIG. 4
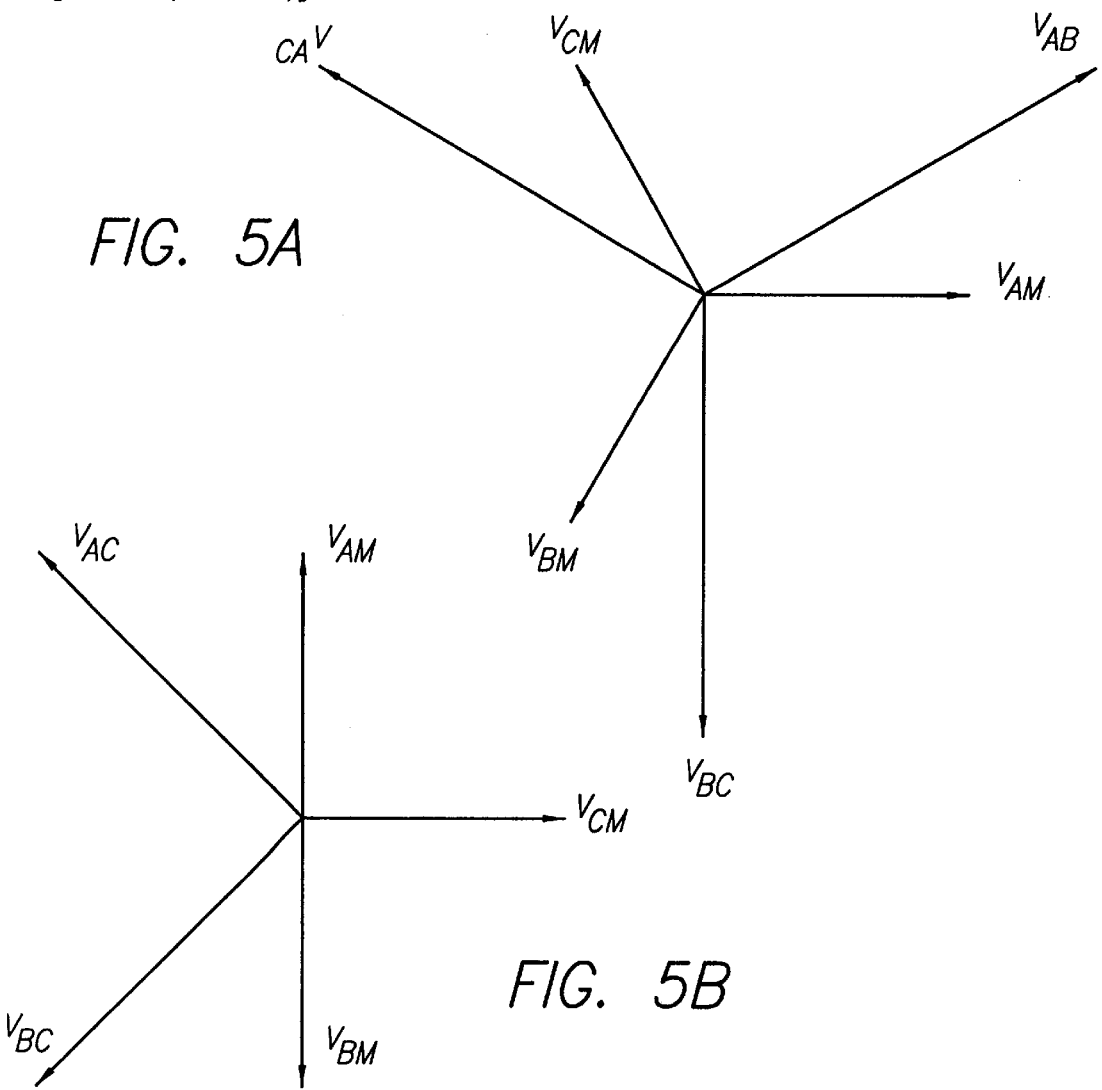
FIG. 5A
FIG. 5B

DC/AC INVERTER APPARATUS FOR THREE-PHASE AND SINGLE-PHASE MOTORS

BACKGROUND OF THE INVENTION

This invention relates generally to dc/ac inverter apparatus and, more particularly, to dc/ac inverter apparatus configured to selectively drive either a three-phase motor or a single-phase motor. The invention also relates generally to variable-voltage power systems incorporating a photovoltaic array and the like, for powering loads such as the inverter apparatus and, more particularly, to circuits and techniques for preventing an excessively high input voltage from damaging the load.

Inverter apparatus of this particular kind are commonly used to power ac motors using dc power derived from photovoltaic arrays and other variable-voltage power sources. Both three-phase motors and single-phase motors have been driven using inverters of this kind. Three-phase motors typically include three input terminals and three inductive windings arranged either in a Y configuration or a delta configuration. Single-phase motors, on the other hand, typically include two input terminals and two windings, with a main winding and a supplemental winding. The supplemental winding typically has the same inductance as, but a higher resistance than, the main winding, and it is commonly used with a series capacitor for starting.

Inverter apparatus for driving three-phase motors provide three ac output voltage signals that are phased at 120° relative to each other so as to efficiently drive the motor. This is accomplished using three pairs of switches, typically high-speed power transistors, with each pair being connected in series between an input terminal carrying the dc input voltage and a reference terminal carrying a negative reference voltage, or ground. Reverse-biased diodes are connected across each transistor, for use when switching inductive loads, such as motors. The nodes between the three pairs of switches, or poles, constitute the inverter's three output terminals. Generally, one transistor or the other of each pole is switched ON at any one time, and the duty cycles of the switching are controlled such that each pole simulates an ac voltage having the desired frequency and phase angle. The three-phase motor thereby is driven at a speed proportional to the ac voltage frequency.

Inverter apparatus for driving single-phase ac motors of the kind described above typically provide a single ac voltage signal for coupling through the motor's main winding and via a capacitor through the motor's supplemental winding. A second terminal of the motor couples the node between the two windings to a negative voltage reference, or ground. Inverters of this kind typically have included two pairs of switches or poles, again typically high-speed power transistors, and a controller switches ON just one transistor of each pole at a time. The duty cycle of the switching is controlled so as to simulate an ac voltage waveform having the desired frequency.

The inverter apparatus described briefly above have functioned satisfactorily to drive the three-phase or single-phase motors for which they have been configured. Sometimes, however, it is desirable to provide for the selective use of either a three-phase motor or a single-phase motor. In the past, this generally has required two separate inverters, one configured for three-phase motors and the other for single-phase motors. This adds significantly to the apparatus' expense and complexity. There is a need for an inverter apparatus that can conveniently be used to drive either a three-phase motor or a single-phase motor without requiring any substantial hardware reconfiguration. The present invention fulfills this need.

Inverter apparatus of the general kind described above, as well as other electrical loads, are vulnerable to damage from the application of excessive input voltages when they are powered by a variable dc power source such as a photovoltaic, or solar, array. Such power sources are considered to be "soft," meaning that their voltage levels can vary over a wide range, depending on several factors, including current loading and temperature. FIG. 1 depicts a voltage versus current relationship for one typical photovoltaic array. It will be noted that the array's voltage level drops monotonically with increasing current draw and that one particular combination of voltage and current provide maximum power output. Photovoltaic power systems typically are controlled to operate at or near this peak power point. It will be noted that the open-circuit voltage level is substantially greater than the voltage level at the peak power point. In addition, the voltage level varies significantly with variations in the array's temperature, and the current level varies substantially with variations in the incident sunlight, or insolation.

Because the photovoltaic array's open-circuit voltage can be substantially higher than the array's voltage at the peak power point, particularly at cold temperatures, appropriate steps must be taken to prevent this high voltage from damaging the load, e.g., an inverter apparatus. Typically, this is achieved by configuring the load to withstand the application of such a voltage. This can dramatically increase the load's cost and complexity. A need therefore exists for a less costly and less complex means for preventing the application of such high voltages to a load such as an inverter apparatus. The present invention fulfills this need.

SUMMARY OF THE INVENTION

The present invention is embodied in a power inverter apparatus for selectively driving either a three-wire, three-phase ac motor or a three-wire, single-phase ac motor, with minimal increased hardware complexity over that of a power inverter apparatus for driving just one kind of such motors. More particularly, the power inverter apparatus is used with a dc voltage supply, e.g., a photovoltaic array, and it includes first, second and third pairs of electrical switches, or poles, each pole including first and second series-connected switches connected between a terminal carrying a positive dc voltage and a terminal carrying a negative reference voltage, or ground. The nodes between the first and second switches of the three poles form first, second and third output terminals suitable for connection to the three input terminals of the connected motor. Further, a controller selectively switches ON and OFF the switches of the three poles according to a predetermined sequence that provides high-speed pulse-width modulation, such that the apparatus is selectively conditioned to drive either the three-phase motor or the single-phase motor.

More particularly, the controller alternately switches ON the first switch and the second switch in each pole, at duty cycles that vary substantially sinusoidally between 0 and 100% and at a common frequency proportional to the speed at which the connected motor is to be driven. The relative phase angles of the sinusoidally varying duty cycles of the switching of the three switch pairs are selected according to whether a three-phase motor or a single-phase motor is being driven.

In a separate and independent feature of the invention, the inverter apparatus, or any similar load, is protected against the application of a dc input voltage exceeding a predetermined maximum level. This feature of the invention is useful when the load is being driven by a "soft" source such as a photovoltaic array that provides a dc voltage that varies substantially with load current. In accordance with the invention, the power apparatus includes a voltage clamp having an input terminal connected to the dc power source and an output terminal connected to the load, and the clamp is responsive to the voltage level being supplied to the load, for intermittingly shorting out the dc power source, such that the voltage applied to the load never exceeds the predetermined maximum voltage level.

More particularly, the voltage clamp includes a storage capacitor connected between the output terminal and ground, a diode connected between the input terminal and the output terminal for charging the capacitor to a voltage level, and a switching circuit responsive to the capacitor voltage for selectively shorting the input terminal to a negative voltage reference, or ground. While the photovoltaic array or other similar dc power source is so shorted out, the diode is reversed biased and the capacitor voltage discharges through the load. The switching circuit can include comparator means, for comparing the capacitor voltage with predetermined maximum and minimum thresholds. A switchable transistor is conditioned to short out the photovoltaic array when the comparator means determines that the capacitor voltage exceeds the predetermined maximum threshold, and the switchable transistor is conditioned to terminate its shorting out of the photovoltaic array when the comparator means determines that the capacitor voltage has dropped below the predetermined minimum threshold. The maximum and minimum thresholds can be generated by a zener diode/resistor network connected in parallel with the capacitor.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1 is a graph showing the relationship between voltage and current for a typical photovoltaic array.

FIG. 2 is a simplified block diagram of a photovoltaic power apparatus embodying the invention, for selectively driving either a three-phase ac motor or a single-phase ac motor.

FIG. 3 is simplified schematic diagram of the inverter circuit of FIG. 2, shown driving a three-phase ac motor.

FIG. 3A is a simplified wiring diagram of a single-phase ac motor that may be selectively substituted for the three-phase motor of FIG. 3.

FIG. 4 is a schematic diagram of a switching control circuit that is part of the inverter of FIG. 2, for generating the transistor control signals that switch ON and OFF the inverter's power transistors depicted in FIG. 3.

FIG. 5A is a phasor diagram of the voltage signals supplied by the inverter when driving a three-phase ac motor.

FIG. 5B is a phasor diagram similar to that of FIG. 5A, but showing the inverter's output voltage signals supplied when driving a single-phase ac motor.

DESCRIPTION OF THE PREFERRED EMBODIMENT

Figure 6:
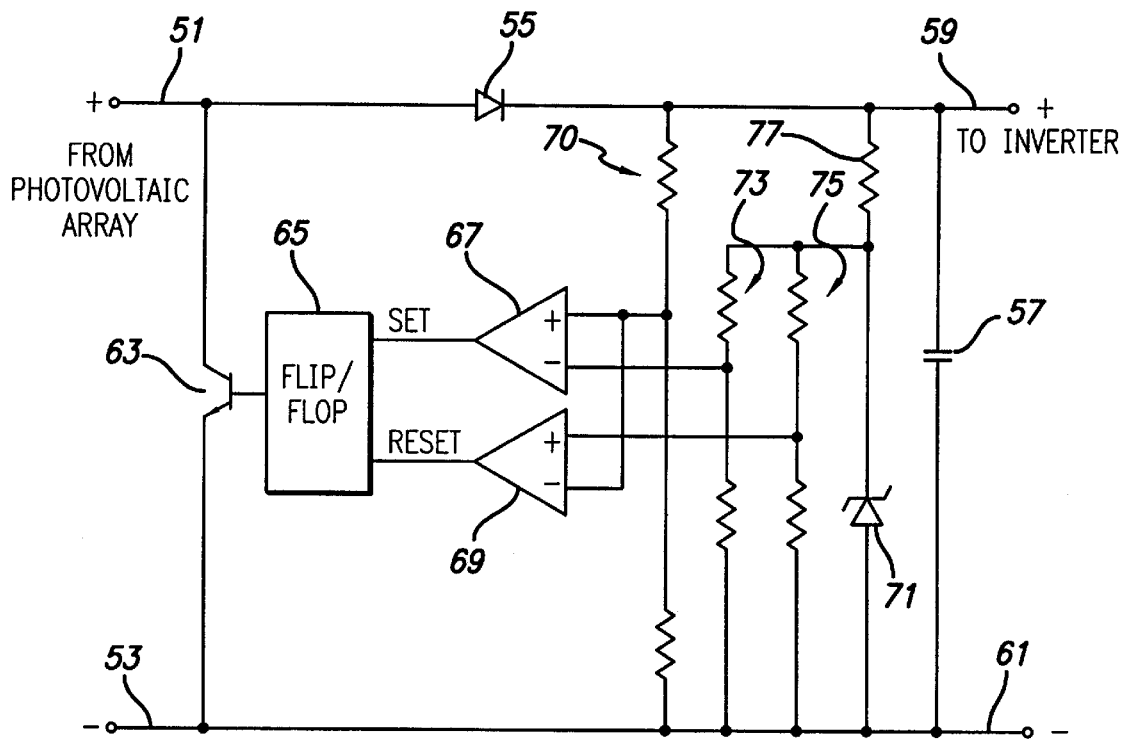
FIG. 6 is a simplified schematic diagram of the voltage clamp circuit of FIG. 2.

With reference now to the drawings, and particularly to FIG. 2, there is shown a photovoltaic power system that is configured to selectively drive either a three-phase ac motor or a single-phase ac motor. The system is useful, for example, in powering a well-water pump located remote from a conventional ac power grid. The system is depicted to include a photovoltaic array 11 and a voltage clamp circuit 13 for specially conditioning the dc power produced by the photovoltaic array. A dc/ac inverter 15 is configured to selectively drive either a three-phase ac motor 17A or a single-phase ac motor 17B, which is selected for use depending on special requirements and availability the selection is made using a switch 18.

With reference now to FIG. 3, there is shown a simplified schematic diagram of a portion of the dc/ac inverter 15, shown connected to a conventional three-terminal, three-phase ac motor 17A. The inverter includes three pairs of high-speed power transistors 19A and B, 21A and B, and 23A and B. A reverse-biased diode is connected across each transistor, as is conventional. The two transistors of each transistor pair are connected in a series between positive and negative input terminals 25 and 27, respectively, which carry dc power from the voltage clamp circuit 13. The nodes between the three pairs of transistors, or poles, form the inverter's output terminals 29A, B, and C. These output terminals are connected directly, or through a suitable filter (not shown), to the input terminals of the three-phase motor 17A. The three pairs of transistors are controllably switched ON and OFF at prescribed time-varying duty cycles, so that the inverter supplies on its output terminals 29A, B, and C voltage waveforms that simulate ac waveforms having frequencies proportional to the speed at which the motor is to be driven. In the case of a three-phase motor, these three simulated ac waveforms are phased at 120° with respect to each other.

The actual voltage present at each output terminal 29A, B, or C of the inverter 15 switches rapidly between the positive voltage present at the positive terminal 25 and the negative voltage (or ground) present at the negative terminal 27. This is accomplished by alternately switching ON the first and second transistors in each pole. The duty cycles of the switching is controllably adjusted to vary sinusoidally between 0% and 100%, so as to simulate the desired ac waveform. As is conventional, a brief dead time is provided between the switching ON of the first and second transistors in each pole, to prevent any possibility of the two transistors conducting current simultaneously.

FIG. 4 depicts a switching control circuit that is part of the inverter 15, for generating the six transistor control signals used to switch ON and OFF the six inverter transistors 19A and B, 21A and B, and 23A and B. When the inverter is being called upon to drive a three-phase motor 17A, the switching control circuit receives on lines 31 and 33 two sinusoidal signals from a microprocessor (not shown in the drawings). The signals have identical frequencies, corresponding to the speed at which the motor is to be driven, but have phase angles that differ by 120° with respect to each other. Those skilled in the art will appreciate how such phased sinusoidal signals can be generated. These two signals are connected directly to a pulse-width modulator 35, which conveniently can take the form a conventional sine-triangle modulator. This produces two control signals output on lines 37A and B, for controlling the power transistors 19A and B, and also produces two control signals output on lines 39A and B, for controlling the transistors 23A and B.

The switching control circuit further includes an inverting amplifier 41 that sums together two sinusoidal input signals on lines 31 and 33 to produce a third sinusoidal signal having the same frequency as the first two signals, but a phase angle that differs by 120° from each. This latter signal is delivered to the pulse-width modulator 35 on line 43, to produce two control signals output on lines 45A and B, for controllably switching the power transistors 21A and B. Thus, the switching control circuit of FIG. 4 produces the six transistor control signals based on just two appropriately phased sinusoidal input signals.

FIG. 5A is a phasor diagram showing the relative phase angles of the three duty-cycle modulated voltage signals applied to the three input terminals of the three-phase motor 17A. These voltage signals, i.e., $V_{AM}$, $V_{BM}$, and $V_{CM}$, all are referenced to a voltage that corresponds to the midpoint of the dc bus. The resulting line-to-line voltages, i.e., $V_{AB}$, $V_{CA}$, and $V_{BC}$, also are shown in the phasor diagram. It will be noted that all three line-to-line voltages are phased at 120° with respect to each other, regardless of frequency. This arrangement efficiently drives the three-phase motor at a speed proportional to the frequency.

As previously mentioned, the same inverter hardware depicted in FIGS. 3 and 4 can be used to drive a single-phase ac motor 17B of the kind having three input terminals and two windings. A diagram of such a single-phase motor is provided in FIG. 3A. A main winding 45 of such a motor is the winding typically used when the motor is being driven, while a supplemental winding 47 typically is used only during start-up. When powering a single-phase motor of this kind, the inverter's three output terminals are connected directly to the motor's three input terminals, and the inverter is appropriately conditioned to provide sinusoidally varying, duty-cycle modulated voltage signals that are specially phased with respect to each other. This phasing is different from that of the voltage signals used when powering a three-phase motor. In particular, the phase of the voltage signal applied to the terminal A for the main winding 45 is made to lead by 180° the voltage signal applied to the input terminal B for the supplemental winding 47 and to lead by 90° the voltage signal applied to the input terminal C for the node N.

This phasing of the inverter voltage signals is accomplished using transistor control signals supplied by the very same switching control circuit of FIG. 4 that is used when powering the three-phase motor 17A. When generating the control signals necessary for driving the single-phase motor 17B, the circuit receives sinusoidal signals on its input terminals 31 and 33 that are phased at 90° with respect to each other. These phases are indicated in brackets in FIG. 4. In this case, a switch 49 in the leg connecting the terminal 33 to the inverting amplifier 41 is open, such that the inverting amplifier produces at its output line 43 a sinusoidal signal whose phase is the inverse of that for the signal on line 31. Thus, a third sinusoidal signal is generated, having a phase angle that lags by 90° the phase angle of the signal on line 33.

FIG. 5B is a phasor diagram showing the phase angles of the sinusoidally varying voltage signals applied to the three terminals A, B and C of the single-phase motor 17B. It will be noted that $V_{AM}$ leads the voltage $V_{CM}$ by 90° and the voltage $V_{BM}$ by 180°. The line-to-line voltages that result, i.e., $V_{AC}$ and $V_{BC}$, thereby will be phased at 90° with respect to each other, regardless of frequency. This arrangement efficiently drives the single-phase motor 17B at a speed proportional to the frequency.

The photovoltaic array 11 (FIG. 2) provides a voltage output that varies substantially with current, as shown in FIG. 1. One particular set of values for voltage and current provides a maximum power output, and it is desirable to operate the photovoltaic power system at or near these values. When no current is being drawn from the array, however, its open circuit voltage can be substantially greater than the voltage at the peak power point. In the past, power systems have been configured so that the load, in this case the dc/ac inverter 15, can withstand the application of substantially increased input voltages. This has led to substantially increased costs and complexity.

As shown in FIG. 6, the photovoltaic power system of the invention withstands this excess voltage situation in a different way, by shorting out the photovoltaic array 11 whenever the voltage that otherwise would be applied to the inverter 15 exceeds a predetermined maximum threshold. The array remains shorted out until that applied voltage drops below a predetermined minimum threshold.

More particularly, and with reference to FIG. 6, the voltage clamp circuit 13 is connected via lines 51 and 53 to the respective positive and negative terminals of the photovoltaic array 11. A diode 55 in the line 51 delivers current to a storage capacitor 57, to charge it to a dc voltage for output on lines 59 and 61 to the dc/ac inverter 15. A transistor 63 is connected across the input lines 51 and 53. Under the control of a flip/flop 65, the transistor is either switched OFF, thus providing an open circuit, or is switched ON, thus shorting out lines 51 and 53 and thereby shorting out the photovoltaic array. When the transistor is biased ON, the voltage on line 51 drops substantially to zero, which reverse biases the diode 55 and allows the storage capacitor to discharge through the inverter. When the transistor is again biased OFF, the voltage on line 51 rises to again forward bias the diode 55 and resume charging the capacitor 57. At no time is the capacitor, and thus the inverter 15, exposed to a voltage level exceeding the prescribed maximum level.

The voltage clamp circuit 13 of FIG. 6 further includes a first comparator 67, for comparing a measure of the voltage on the capacitor 57 with the predetermined maximum threshold, and a second comparator 69, for comparing the measure of the capacitor voltage with the predetermined minimum threshold. The measure of capacitor voltage is produced by a resistor divider 70. The maximum and the minimum voltage thresholds are derived by a zener diode 71 and two sets of resistor dividers 73 and 75, respectively. The capacitor voltage is applied to the zener diode through a resistor 77.

When the first comparator 67 determines that the capacitor voltage has risen to a level above the predetermined maximum threshold, it couples a signal to the SET input terminal of the flip/flop 65, to set the flip/flop and cause it to bias the transistor 63 ON. Subsequently, after the capacitor 57 has discharged to point where its voltage drops below the predetermined minimum threshold, the second comparator 69 outputs an appropriate signal to the RESET input terminal of the flip/flop, to reset the flip/flop and cause it to bias the transistor OFF. It will, of course, be appreciated that the two comparators 67 and 69 could be substituted by a single comparator, with positive feedback to generate a hysteresis band or by a suitably programmed microprocessor.

Figure 7:
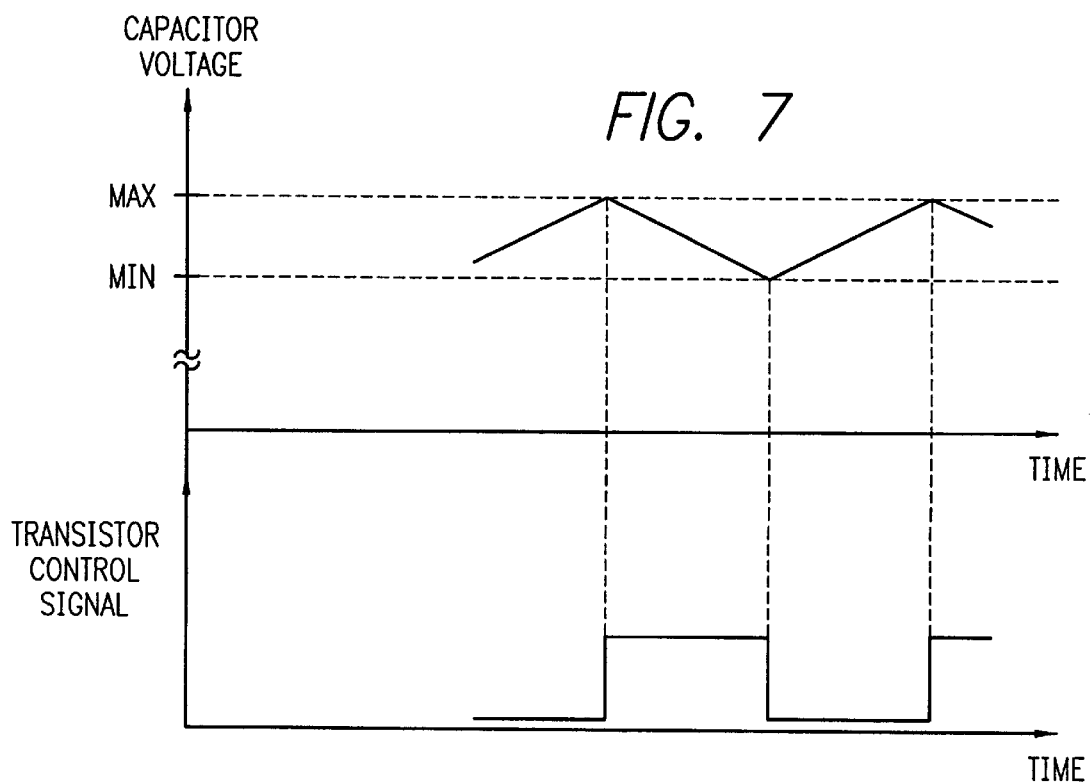
FIG. 7 is a simplified timing diagram showing the relationship between the capacitor voltage and transistor control signal present in the voltage clamp circuit of FIG. 6.

FIG. 7 is a graph depicting the voltage on the capacitor 57 and the output signal produced by the flip/flop 65 for one full cycle of operation of the voltage regulator and clamp circuit 13. It will be noted that when the transistor 63 is biased OFF, the capacitor voltage rises slowly due to charging by the current supplied by the photovoltaic array 11. When that voltage reaches the predetermined maximum threshold, the flip/flop outputs its control signal to bias the transistor ON, whereupon the capacitor voltage slowly diminishes as the stored charge is delivered to the inverter 15. Ultimately, the capacitor voltage reaches the predetermined minimum threshold, and the flip/flop terminates its control signal, to again bias the transistor OFF. Thus, the voltage level present at the capacitor 57 and applied to the inverter 15 never exceeds the predetermined maximum threshold, this despite the fact that the voltage level of the photovoltaic array 11 could otherwise reach a value significantly higher than this threshold. This obviates the need to size the capacitor and the inverter to withstand such substantially increased input voltages.

It should be appreciated from the foregoing description that the present invention provides an improved power system that is conveniently configurable to power either a three-phase ac motor or a single-phase ac motor. No substantial hardware reconfiguration is required to accommodate these different kinds of motors. In addition, the power system is configured to prevent the application of excessively high input voltages from a voltage source such as a photovoltaic array, thereby providing substantial savings in cost and complexity.

Although the invention has been described in detail with reference to the presently preferred embodiment, those of ordinary skill in the art will appreciate that various modifications can be made without departing from the invention. Accordingly, the invention is defined only by the following claims.

We claim:

1. Power inverter apparatus for selectively driving either a three-wire, three-phase ac motor or a three-wire, single-phase ac motor, comprising:

an input terminal for receiving a predetermined dc voltage relative to a reference;

first, second and third pairs of electrical switches, each pair including first and second series connected switches connected between the input terminal and the reference, with the nodes between the first and second switches of the switch pairs forming first, second and third output terminals;

wherein the first, second and third output terminals are connectable to the input terminals of either a three-phase ac motor, having three input terminals and three windings, or a single-phase ac motor, having three input terminals and two windings; and a controller for controllably switching ON and OFF the switches of the first, second and third pairs of switches according to a sequence that provides high-speed pulse-width modulation, such that the apparatus is conditioned to drive either the three-phase motor or the single-phase motor.

2. Power inverter apparatus as defined in claim 1, wherein:

the apparatus drives the connected motor at a variable speed;

controller alternately switches ON the first switch and the second switch in each of the first, second and third pairs of switches, according to a predetermined duty cycle that varies sinusoidally between 0 and 100 percent at a common frequency proportional to the speed at which the connected motor is being driven;

the controller selects the relative phase angles of the sinusoidally varying duty cycles of the switching by the controller of the first, second and third pairs of switches according to whether a three-phase motor or a single-phase motor is connected to the output terminals.

3. Power inverter apparatus as defined in claim 1, wherein the single-phase ac motor includes:

a main winding for driving the motor; and a supplemental winding for starting the motor, the supplemental winding having about the same inductance as the main winding, but having a higher resistance than the main winding.

4. Power inverter apparatus as defined in claim 1, wherein the controller includes a pulse-width modulator having first, second, and third phase-input terminals, the pulse-width modulator providing signals for switching ON and OFF the switches of the first, second, and third pairs of switches based on first, second and third phase voltages received at the first, second and third phase input terminals, respectively, wherein, for driving a three-phase motor, the voltage phase between the first and second phase voltages is +120 degrees and the voltage phase between the first and third phase voltages is −120 degrees and, for driving a single-phase motor, the voltage phase between the first and second phase voltages is −90 degrees and the voltage phase between the first and third phase voltages is +90 degrees.

5. Power inverter apparatus as defined in claim 4, wherein the controller further includes:

a motor-type selection switch; and an inverting amplifier having an output terminal coupled to the third phase-input terminal of the pulse-width modulator, a summing node, a first resistor connected between the first phase input terminal and the amplifier's summing node, and a second resistor, connected in series with the motor-type selection switch, between the second voltage input terminal and the amplifier's summing node;

wherein, for driving a three-phase motor, the switch is closed so that the inverting amplifier generates the third phase voltage based on a combination of the first and second phase voltages; and wherein, for driving a single phase motor, the switch is open so that the inverting amplifier generates the third phase voltage based on the first phase voltage.

* * * * *

UNITED STATES PATENT AND TRADEMARK OFFICE
CERTIFICATE OF CORRECTION

PATENT NO. : 6,232,742 B1
DATED : May 15, 2001
INVENTOR(S) : Joel B. Wacknov et al.

It is certified that error appears in the above-identified patent and that said Letters Patent is hereby corrected as shown below:

Column 4,
Line 14, after "availability" insert a period ".".

Column 7,
Line 31, delete "selectively".

Column 8,
Line 3, before "controller" insert "the".

Signed and Sealed this

Second Day of April, 2002

Attest:

JAMES E. ROGAN
*Attesting Officer*     *Director of the United States Patent and Trademark Office*